United States Patent
Hara

(10) Patent No.: US 7,367,034 B2
(45) Date of Patent: Apr. 29, 2008

(54) DISK DRIVE HAVING MECHANISM TO LIMIT TRAY POSITION DURING TRANSFER OF TRAY

(75) Inventor: Hirotoshi Hara, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 377 days.

(21) Appl. No.: 11/260,263

(22) Filed: Oct. 28, 2005

(65) Prior Publication Data

US 2006/0095929 A1 May 4, 2006

(30) Foreign Application Priority Data

Oct. 29, 2004 (JP) .............................. 2004-315781

(51) Int. Cl.
*G11B 17/04* (2006.01)
(52) U.S. Cl. ...................... 720/613; 720/600; 720/601; 720/606; 720/607; 720/610; 720/611; 720/620
(58) Field of Classification Search ................ 720/600, 720/601, 606, 607, 610, 611, 613, 620; 369/248
See application file for complete search history.

(56) References Cited

U.S. PATENT DOCUMENTS 6,181,663 B1 * 1/2001 Kakuta et al. .............. 720/610

| | | | |
|---|---|---|---|
| 2003/0086358 A1* | 5/2003 | Park et al. ................... | 369/248 |
| 2004/0154031 A1* | 8/2004 | Kimura et al. .............. | 720/613 |
| 2004/0184365 A1* | 9/2004 | Nasu ........................... | 369/43 |
| 2004/0199928 A1* | 10/2004 | Takahashi et al. .......... | 720/603 |

FOREIGN PATENT DOCUMENTS

JP 2001-155402 6/2001

* cited by examiner

*Primary Examiner*—William Klimowicz
*Assistant Examiner*—Carlos E Garcia
(74) *Attorney, Agent, or Firm*—Wenderoth, Lind & Ponack, L.L.P.

(57) ABSTRACT

To provide a disk drive having a mechanism to limit position of a tray while being transferred by a simple configuration, guiding parts each having a guide rib and a supporting portion are provided on at least one outer wall on the side facing inside the chassis, and a sliding part having a guide groove is provided on a sidewall of the tray corresponding to the guiding part. The guide rib of the guiding part is slidably fitted in the guide groove. A horizontal limiting-rib sliding face is formed on a connecting part connecting outer and inner walls of the chassis. The sliding part includes a position-limiting rib extending upward and downward from the leading edge of the tray sidewall with a guide groove formed between the position-limiting rib and the edge of the sidewall. The position-limiting rib is slidably held between the supporting portion and the limiting-rib sliding face.

6 Claims, 7 Drawing Sheets

DISK DRIVE HAVING MECHANISM TO LIMIT TRAY POSITION DURING TRANSFER OF TRAY

BACKGROUND OF THE INVENTION

1. Field of the Invention

The present invention relates to a disk drive having a mechanism to limit position of the tray when the tray is transferred with sliding.

2. Related Art

A disk drive used to reproduce information on a disk such as a CD or a DVD includes: a tray to put a disk on and bring out/in the drive body; a drive part to put the disk on a turn table and rotate the disk; an optical pickup to reproduce information recorded on the disk; and a traverse unit equipped with a transporting device to move the optical pickup or the like. Also, the disk drive includes motors required for those constituents to work. The constituents can carry out needed operations through the respective motors.

Likewise, the tray is driven by a motor when it loads/unloads a disk into/out of the drive body with the disk placed thereon. Specifically, the tray has a rack provided on a side portion of its bottom face, which a gear meshes with the rack and the gear is driven to rotate by the motor. When the gear rotates, the rack meshing with the gear moves to transfer the tray with sliding.

In the structure for transferring the tray, the disk drive is provided with guiding parts to prevent the tray from moving in the transverse direction (a horizontal direction) and in the vertical direction (up-and-down direction). The guiding parts are basically constituted by a combination of a groove and a protrusion. Hence, it is desired to minimize the space where the guiding parts are disposed, so as to downsize and slim the whole disk drive; to simplify the shape of the guiding parts; and to simplify the molding die used for the purpose described above.

For example, JP-A-2001-155402 discloses "DISK LOADING MECHANISM," which loads a disk without increasing the load to move the tray, almost changing the outside shape thereof and generating the state of being swung from left to right violently. As shown in FIG. 4 thereof, guiding parts (1a, 1b) are formed on the inner sides of the two ends of the chassis that are fitted from the bottom face side of the chassis into guide grooves located in the bottom face of the tray in addition to hook-shaped guiding parts (1c) to hold down upper portions at the two ends of the tray. However, it requires a space to form a guiding part in the width direction of the disk drive.

Incidentally, in case of precisely limiting position of the tray in the transverse and vertical directions, when the groove and protrusion provided on the chassis and the tray mesh with each other so as to be brought into their completely fitting condition, a difference in the dimensions of the groove and protrusion could cause a trouble in sliding transfer of the tray.

SUMMARY OF THE INVENTION

In consideration of conventional problems as described above, the present invention aims to provide a disk drive having a mechanism to limit position of the tray while being transferred by a simple shape configuration, and whose guiding parts provided on the chassis take up minimal space to downsize and slim the disk drive.

To achieve the above-described advantage, a disk drive according to the invention includes: a chassis having two outer walls, two inner walls each a given distance away from the corresponding outer wall, and two connecting parts connecting the outer and inner walls; a tray to set a disk on and to bring out and in the disk drive; a plurality of guiding parts on at least one of the outer walls on the side facing inside the chassis, each guiding part having roughly a reversed L-shape including a supporting portion extending horizontally inward and a guide rib extending vertically downward from leading end of the supporting portion; a horizontal limiting-rib sliding face formed on a portion of the connecting parts connecting the outer and inner walls; and a sliding part located by edge of a sidewall of the tray and corresponding to the guiding part, including a position-limiting rib extending upward and downward from leading edge of the sidewall of the tray and a guide groove formed between the position-limiting rib and the edge of the sidewall, wherein the guide rib of the guiding part is slidably fitted in the guide groove, and the position-limiting rib is slidably held between the supporting portion and the limiting-rib sliding face.

With such configuration, the guide rib of the guiding part formed on the chassis is fitted in the guide groove defined by the position-limiting rib of the tray, whereby the tray position is restrained from moving in the crosswise direction. In addition, the position-limiting rib of the tray is slidably held between the supporting portion and the limiting-rib sliding face, whereby the tray position is limited in the vertical direction.

The disk drive may further include: a horizontal rib formed on the other outer wall of the chassis protruding horizontally inward; and a sliding part having a horseshoe shape in cross section, formed on the corresponding edge portion of the sidewall of the tray, wherein the horizontal rib is slidably held by the sliding part. Conversely, the disk drive may include: a horizontal rib formed on the edge portion of one sidewall of the tray protruding horizontally outward; and a sliding part having a horseshoe shape in cross section formed on the corresponding inside portion of the outer wall of the chassis, wherein the horizontal rib is slidably held by the sliding part.

With this configuration, on the side of one end of the chassis the tray position is limited by the horizontal rib and the sliding part only from moving in the vertical direction. However, on the other end of the chassis, the tray position is limited from moving both in the crosswise and vertical directions. Thus, position of the tray as a whole is limited in the vertical and crosswise directions, and therefore the structure of the disk drive can be more simplified.

Further, it is desirable to form openings in portions of the connecting parts located directly below the respective guiding parts. Formation of such openings enables the adoption of a die having a structure that can be divided in a vertical direction, provided that the disk drive has a shorter dimension in the up-and-down direction. Therefore, the manufacturing of the die can be simplified, thereby leading to the cost cutting.

According to the disk drive of the invention, guide ribs and the supporting portions of the guiding parts provided at a plurality of locations on the chassis enable the tray position to be surely limited in left and right directions and vertical direction, and make the guiding part structure simpler. In other words, just the supporting portions extending from the two outer walls of the chassis and the guide ribs extending downward from the leading ends of the supporting portions allows the tray to be limited in position and as such, the dimension of the disk drive in its width direction can be reduced and therefore the disk drive can be downsized.

In addition, the guiding parts are provided at a plurality of locations on the chassis part-by-part and as such, assuming that the dimension in the width direction of the disk drive is fixed, the disk drive can be slimmed by changing the arrangement of components inside the chassis. Further, openings are formed in the connecting parts between the outer and inner walls located directly below the guiding parts by notching portions thereof so that the guiding parts can be formed integrally with the chassis. As a result, the die used to shape the chassis can be more simplified, and therefore the manufacturing cost of the die can be reduced.

DETAILED DESCRIPTION OF PREFERRED EMBODIMENT

Figure 1:
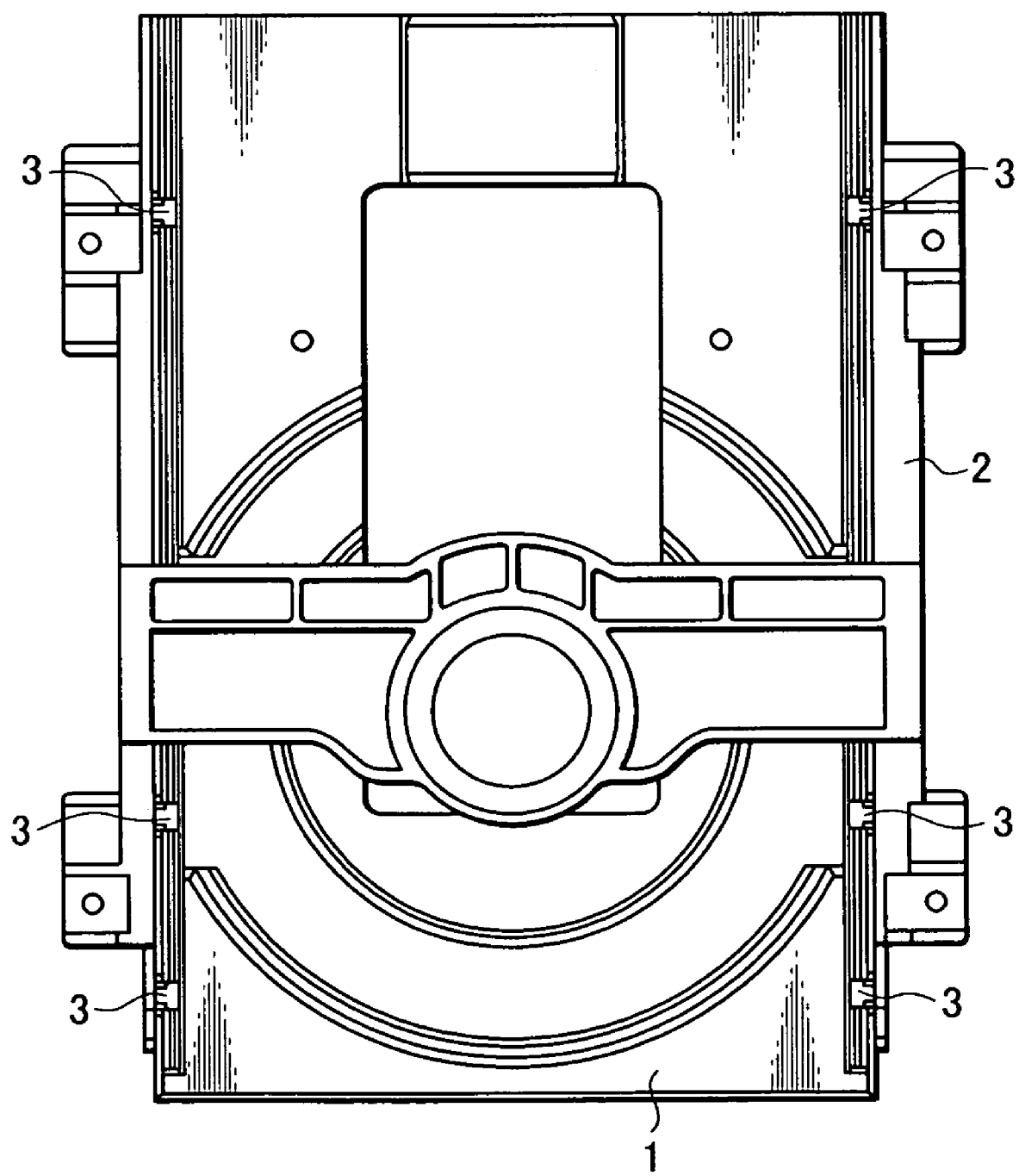
FIG. 1 is a plan view of a disk drive according to an embodiment of the invention, showing the situation where the tray is accommodated in the chassis.
Figure 2:
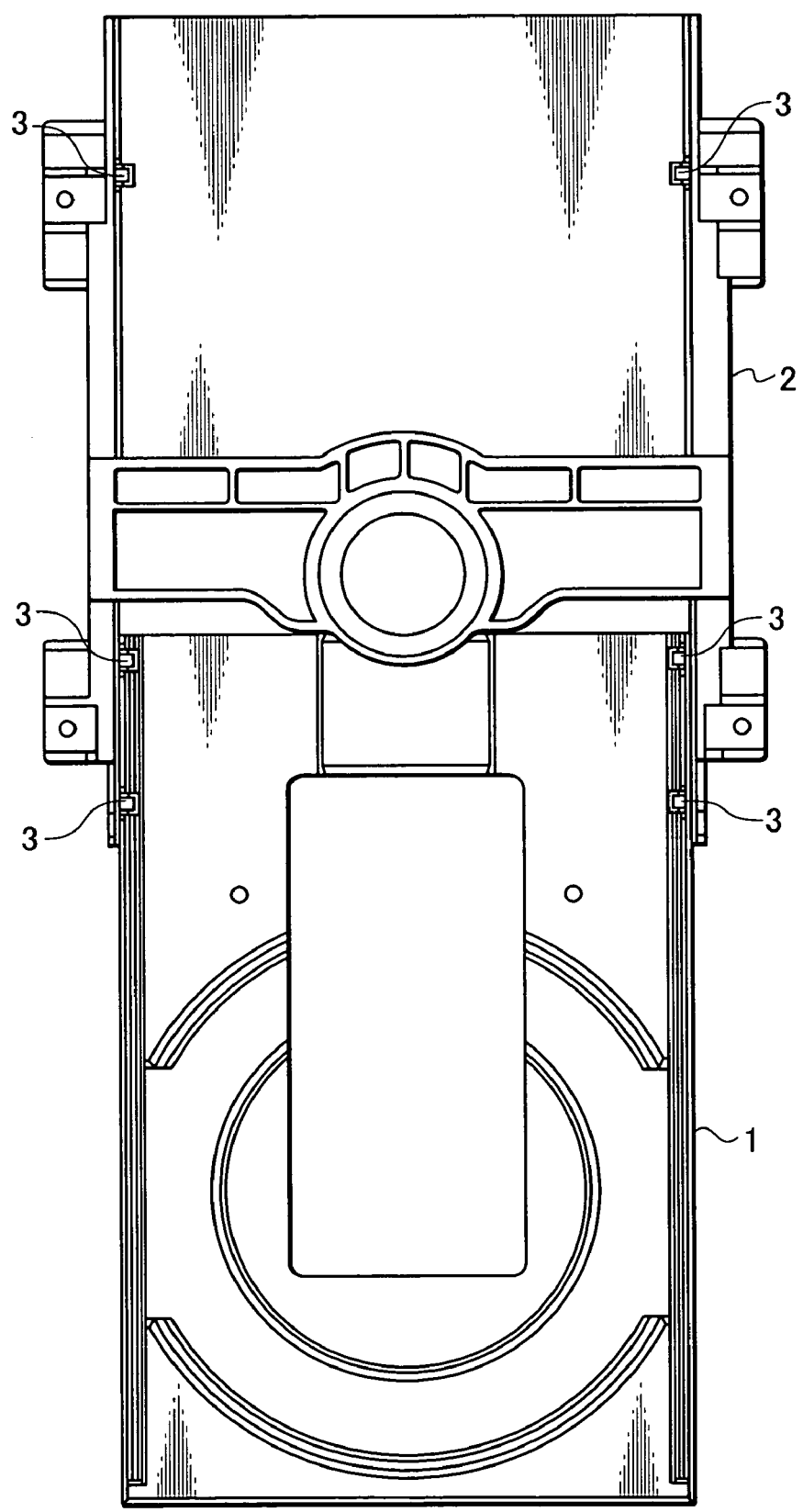
FIG. 2 is a plan view showing the situation where the tray is brought out from the chassis.

The drawings show a disk drive having a mechanism to limit the tray position during transfer of the tray according to the embodiment. The description of a part shown in the drawing that does not comprise a characteristic element of the invention, such as a traverse unit, is omitted. FIG. 1 shows a disk drive in the situation where a tray 1 is accommodated in the disk drive. FIG. 2 shows the situation where the tray is brought out. On the upper face of the tray 1 is formed a round depression in which the disk is set. The tray can be transferred slidingly when a gear driven and rotated by a motor meshes with a rack provided on the lower face of the tray.

Figure 3:
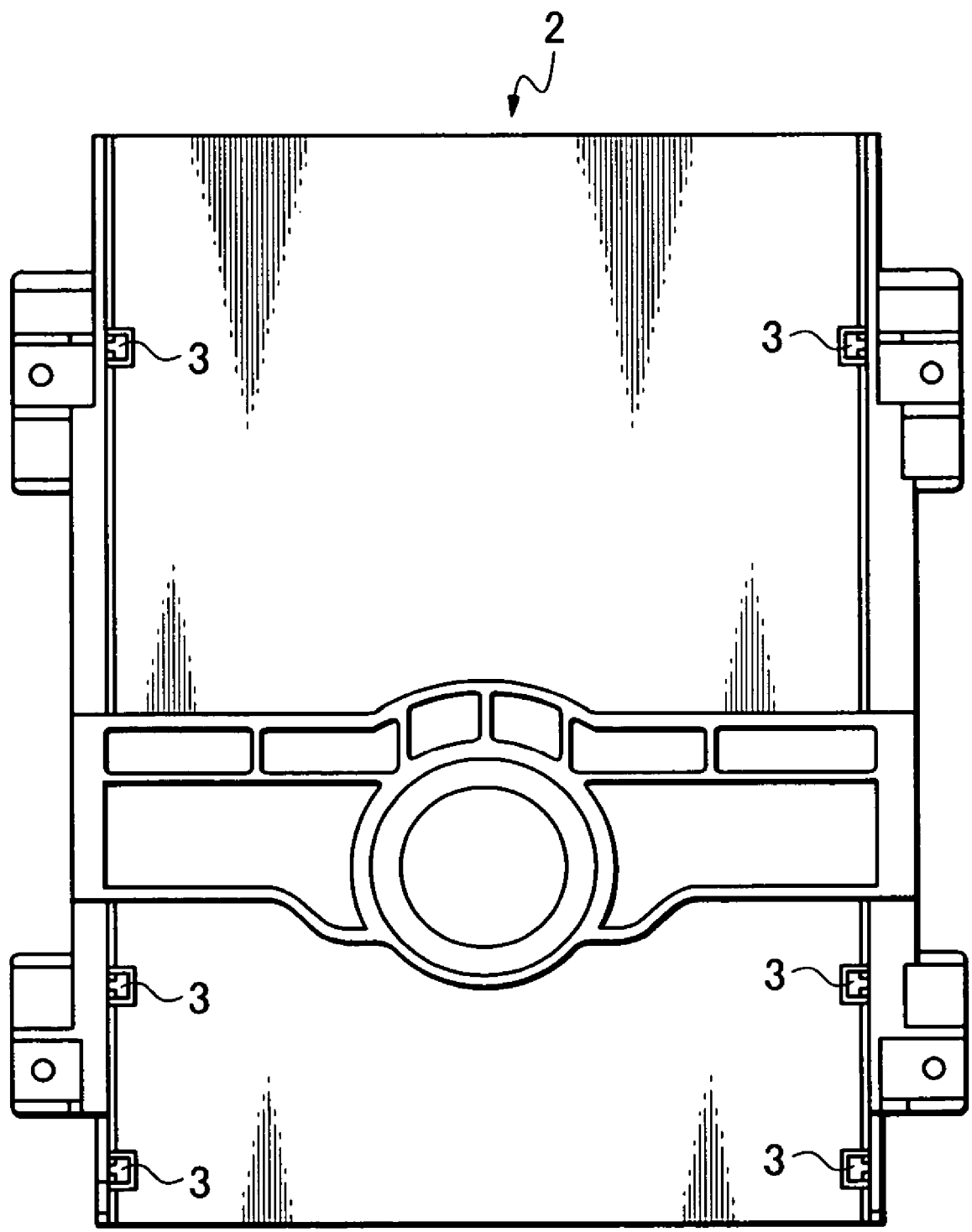
FIG. 3 is a plan view showing the chassis in the situation where the tray is dismounted.
Figure 4:
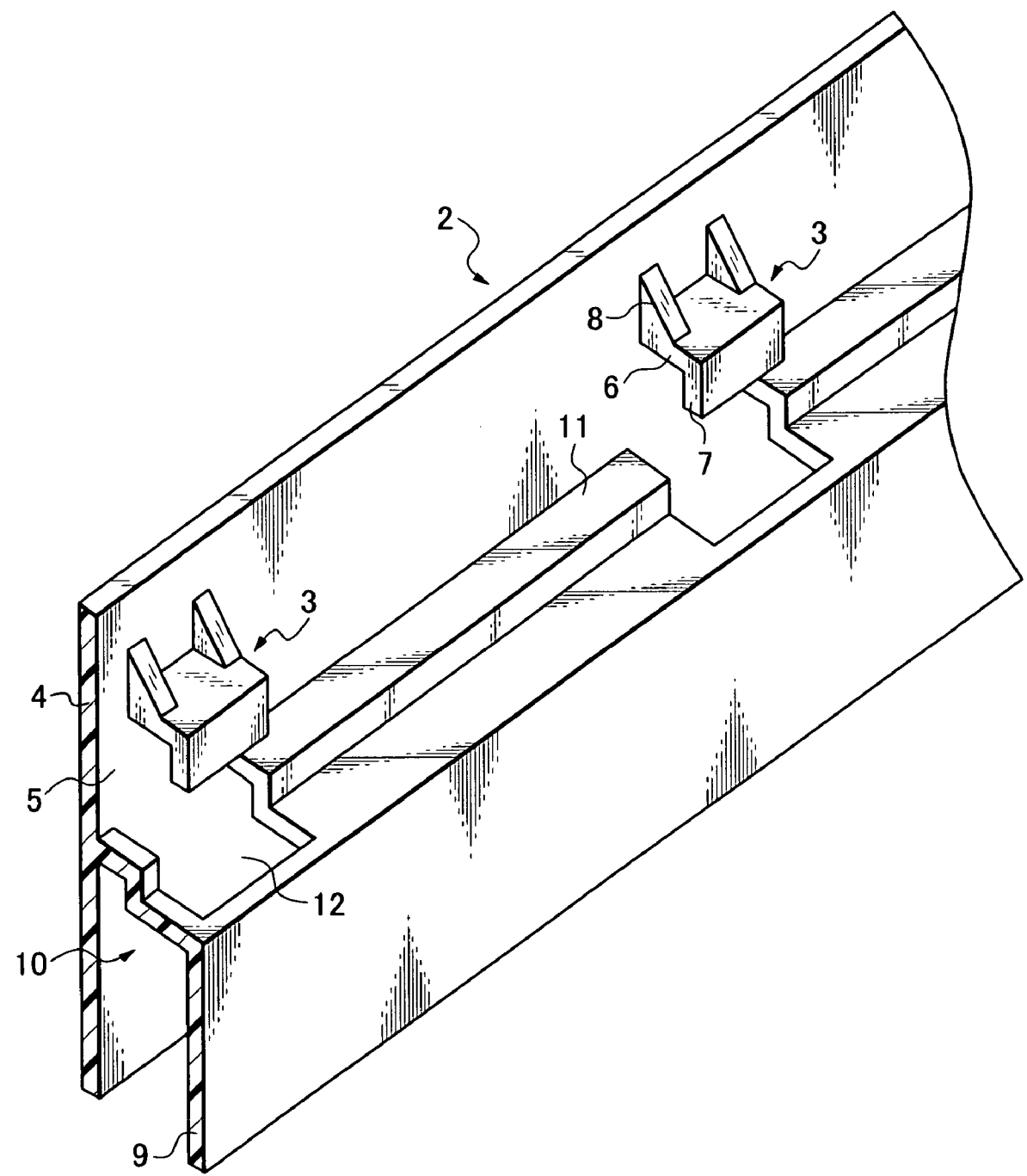
FIG. 4 is an enlarged, fragmentary, perspective view showing a structure of the guiding part provided on an outer wall of the chassis.

FIG. 3 shows a chassis 2 with the tray 1 dismounted. On each side of the chassis 2, three hooked guiding parts 3 are provided at three locations. As shown in FIG. 4, the guiding parts 3 have a roughly reversed L-shape protruding from the inner surface 5 of an outer wall 4 of the chassis 2. In other words, each guiding part 3 has a supporting portion 6 extending from an inner surface 5 horizontally and a guide rib 7 extending from the leading end of the supporting portion 6 downward. At a corner formed by the inner surface 5 and each supporting portion 6, a reinforcing rib 8 is provided to reinforce the guiding part 3.

Below the guiding parts 3, an inner wall 9 is formed in parallel with and a given distance away from the outer wall 4. The inner wall 9 is connected with the outer wall 4 by a connecting part 10 extending from the inner surface 5 of the outer wall 4. The connecting part 10 is formed so as to have a step extending midway forming a level limiting-rib sliding face 11. The connecting part 10 has an opening 12 formed in directly below each guiding part 3. The chassis 2 is molded from a resin, and the guiding parts 3 and inner wall 9 are integrally formed with the chassis 2.

Figure 5:
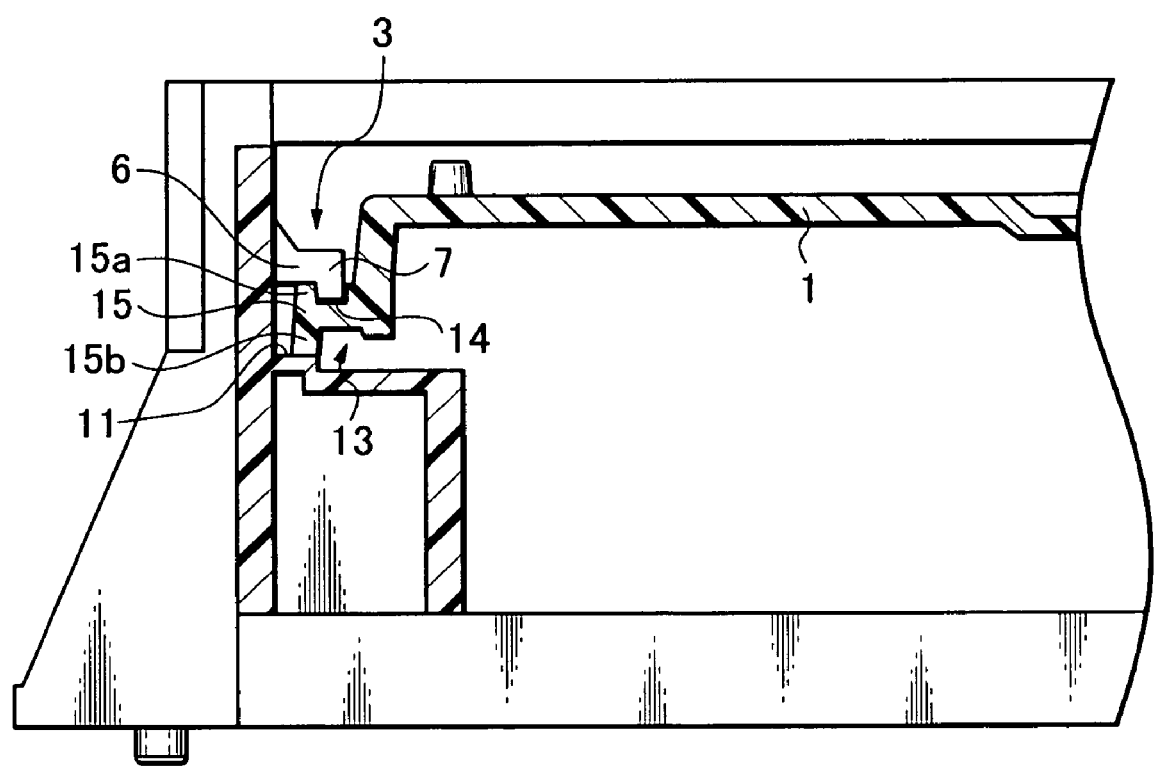
FIG. 5 is a vertical cross sectional view of the disk drive, showing the situation where the tray position is limited by the guiding part.
Figure 6:
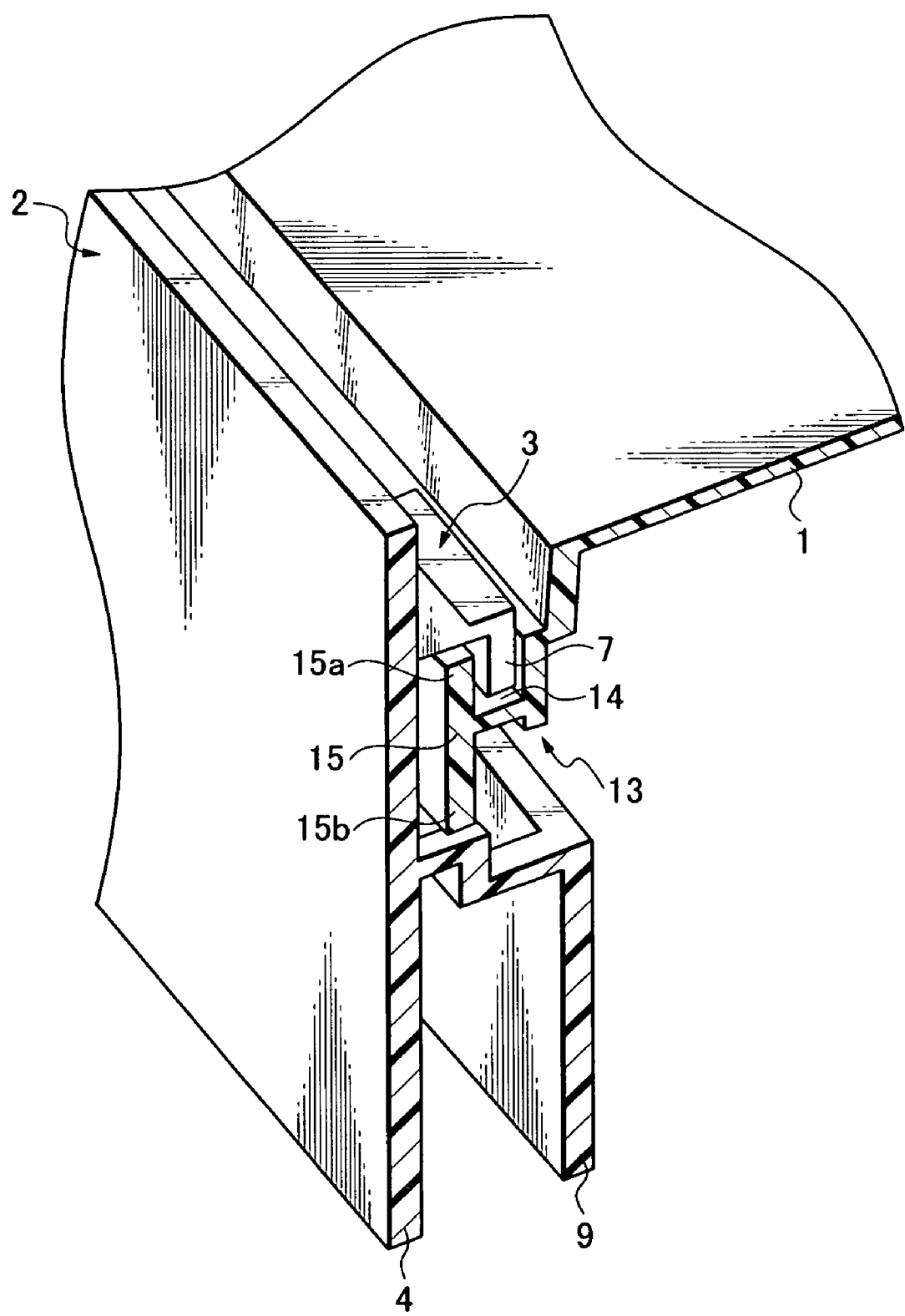
FIG. 6 is an enlarged, fragmentary, perspective view showing the situation where the tray position is limited by the guiding part.

On the other hand, as shown in FIGS. 5 and 6, the tray 1 has sliding parts 13 formed at its both side edges, which are slidably fitted on the guiding parts 3. Each sliding part 13 outwardly protrudes from the lower edge of a wall extending downward from the edge of the tray 1. The sliding part 13 has a position limiting rib 15 extending upward and downward from the leading edge, and a guide groove 14 is thereby formed between an upper portion 15a of the position-limiting rib 15 and the wall extending downward from the edge of the tray. The guide rib 7 of the guiding part 3 is fitted into the guide groove 14. Then, the upper edge of the position-limiting rib 15 is brought into contact with the lower face of the supporting portion 6, and the lower edge of the position-limiting rib 15 is brought into contact with the limiting-rib sliding face 11. Thus, the position-limiting rib 15 is held by and restricted between the supporting portion 6 of the guiding part 3 and the limiting-rib sliding face 11, whereby position of the tray 1 is limited in the vertical direction, and is limited in the horizontal direction of the tray 1 by the guide rib 7 fitted in the guide groove 14 of the sliding part 13. The tray 1 is transferred slidingly in a situation limited in position by the guiding parts 3.

The guiding parts 3 are not formed in a row, but provided at three appropriate locations on the outer wall 4 of the chassis. Therefore, a space is formed between the guiding parts 3, which can be utilized as a location to mount another electronic component.

Figure 7:
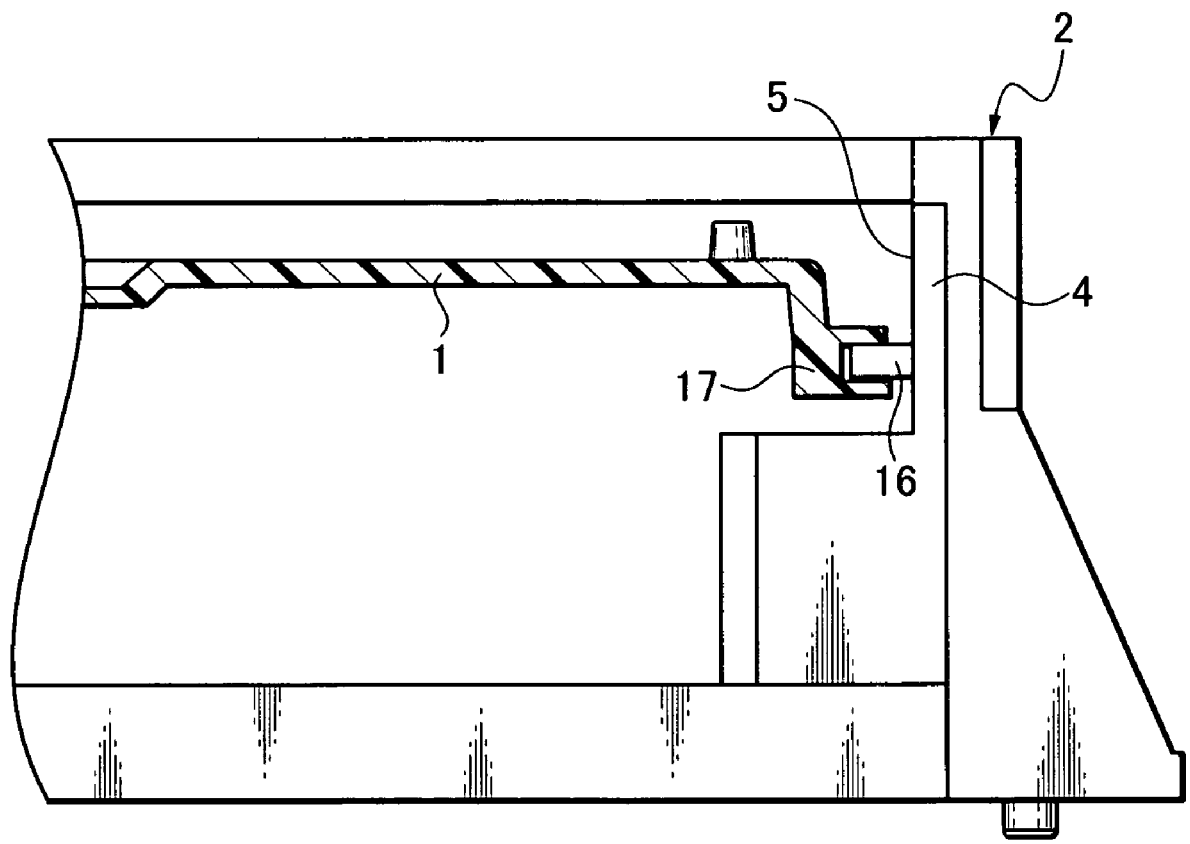
FIG. 7 is a vertical cross sectional view of a disk drive according to another embodiment.

In the above-described embodiment, the hooked guiding parts 3 are formed on the both sides of the chassis 2, thereby forming the position-limiting structure shown in FIGS. 5 and 6. However, the position-limiting structure on one end portion may be structured as shown in FIG. 7. Specifically, such position-limiting structure may comprise a horizontal rib 16 formed horizontally protruding from the inner surface 5 of the outer wall 4 of the chassis 2 and a sliding part 17 having a horseshoe shape in cross section formed on the corresponding side edge of the tray 1, in which the sliding part 17 limits position of the tray 1 by placing the rib 16 inside therebetween. In this case, position of the tray 1 is limited by the horizontal rib 16 in the up-and-down direction and is limited by the guiding parts 3 shown in FIGS. 4, 5 in the horizontal direction.

What is claimed is:

1. A disk drive comprising:
   a chassis having two outer walls, two inner walls each a given distance away from the corresponding outer wall, and two connecting parts connecting the outer and inner walls;
   a tray to set a disk on and to bring out and in the disk drive;
   a plurality of guiding parts on at least one of the outer walls on the side facing inside the chassis, each guiding part having roughly a reversed L-shape including a supporting portion extending horizontally inward and a guide rib extending vertically downward from leading end of the supporting portion;
   a horizontal limiting-rib sliding face formed on a portion of the connecting parts connecting the outer and inner walls; and
   a sliding part located by edge of a sidewall of the tray and corresponding to the guiding part, including a position-limiting rib extending upward and downward from leading edge of the sidewall of the tray and a guide groove formed between the position-limiting rib and the edge of the sidewall, wherein the guide rib of the guiding part is slidably fitted in the guide groove, and the position-limiting rib is slidably held between the supporting portion and the limiting-rib sliding face.

2. A disk drive according to claim 1, wherein the other outer wall of the chassis has a horizontal rib protruding horizontally inward, and a sliding part having a horseshoe shape in cross section is formed on the corresponding edge portion of the sidewall of the tray, whereby the horizontal rib is slidably held by the sliding part.

3. A disk drive according to claim 1, wherein a horizontal rib is formed on the edge portion of one sidewall of the tray protruding horizontally outward; and a sliding part having a horseshoe shape in cross section is formed on the corresponding inside portion of the outer wall of the chassis, whereby the horizontal rib is slidably held by the sliding part.

4. A disk drive according to claim 1, wherein openings are formed respectively in portions of the connecting part located directly below the respective guiding parts.

5. A disk drive according to claim 2, wherein openings are formed respectively in portions of the connecting part located directly below the respective guiding parts.

6. A disk drive according to claim 3, wherein openings are formed respectively in portions of the connecting part located directly below the respective guiding parts.

* * * * *